April 22, 1941.  C. EDDISON  2,239,414
COATING METAL WITH GRAPHITIC CARBON
Filed Aug. 30, 1938
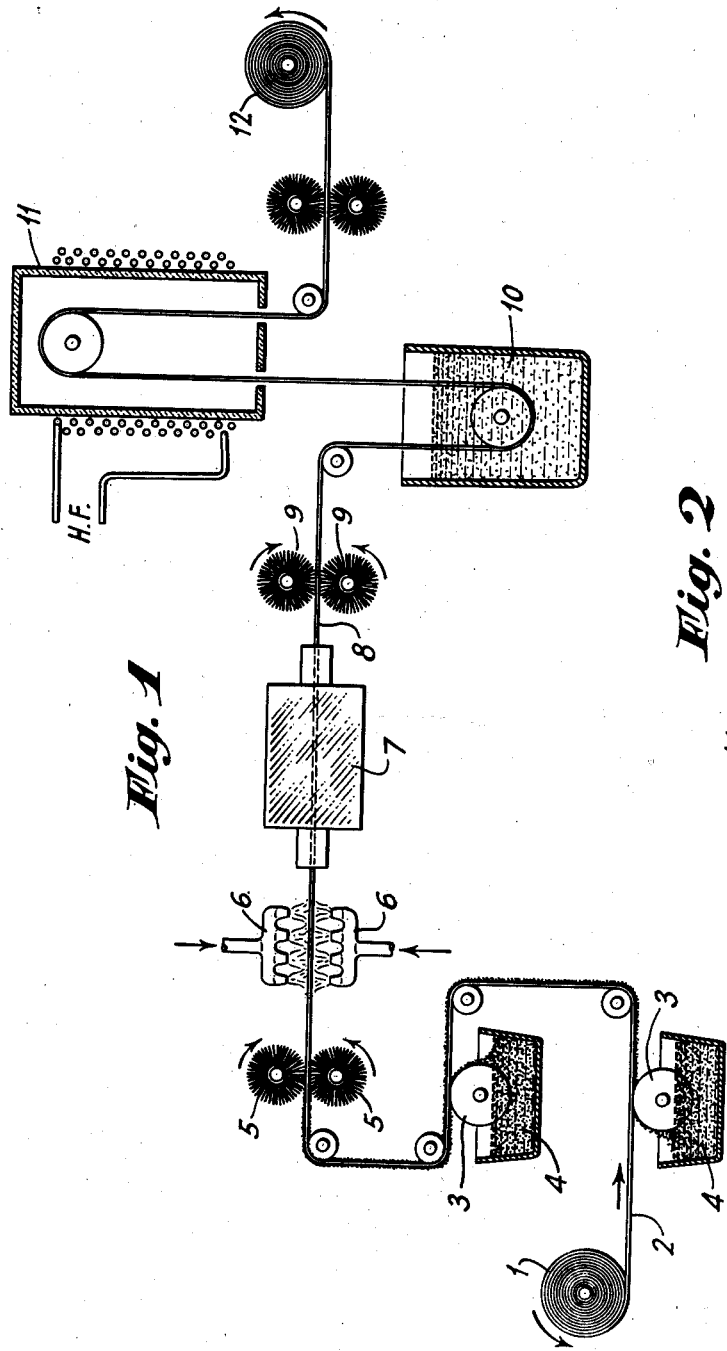
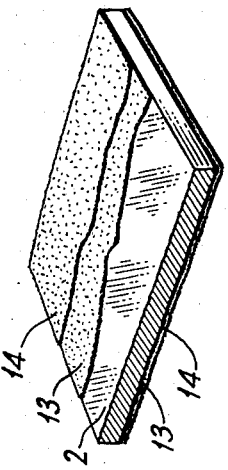
INVENTOR.
CLIFFORD EDDISON
BY Charles McClair
ATTORNEY.

Patented Apr. 22, 1941

2,239,414

UNITED STATES PATENT OFFICE 2,239,414

COATING METAL WITH GRAPHITIC CARBON

Clifford Eddison, East Orange, N. J., assignor, by mesne assignments, to Radio Corporation of America, New York, N. Y., a corporation of Delaware Application August 30, 1938, Serial No. 227,478

2 Claims. (Cl. 91—70)

My invention relates to a method and means for carbon coating metals and more particularly to carbon coating iron, nickel, copper and similar metals suitable for use in the manufacture of radio tube parts.

It has been proposed to apply carbon coatings by heating metal in a hydrocarbon gas atmosphere, or by covering the metal with a thin paste layer of carbon particles and firing the paste covered metal in a non-oxidizing atmosphere. The carbon coating thus produced may not be as stable at high temperatures in the presence of residual gases during exhaust of a radio tube as is desirable. The carbon layer may crackle and sputter, leaving the decrepitated metal with uncoated areas, particularly when attempts are made to overcome this difficulty by merely increasing the thickness, because increasing the amount of paste or carbon applied to the metal produces a powdery excess of carbon which is easily dislodged.

An object of my invention is to provide an improved method and means for carbon coating iron, nickel, copper and similar metals.

In accordance with my invention the surface of the metal is first coated or carbonized by finely divided carbon and graphite kept in intimate contact with the metal while the metal is heated to a temperature above 350° C. and below the formation temperature of carbides of the metal. For the first coating I prefer to use fine particles of carbon and graphite passed through a standard 325 mesh screen and mixed in the proportion of about one part carbon to two parts graphite and prepared as a paste with one or more oleaginous binders such as palmitic acid and lard oil which upon heating to decomposition yield carbon as an end product. The carbon is preferably amorphous and the graphite is crystalline. A thin coat of the paste is applied to the metal and the coated metal heated in a reducing or inert atmosphere to decompose these binders into their elements, thus expelling the volatile constituents and leaving a thin dense coating of pure residual carbon which is more or less graphitic, and adheres tenaciously to the metal but apparently does not form a chemical bond with it. In accordance with my invention I then increase the thickness of the coating without applying particles which may be dislodged during the manufacture or use of the tube by applying in an entirely different manner, a second black coating which may be of graphite. For the second coat the graphite preferably is finely powdered and suspended in a liquid such as nitrocellulose dissolved in butyl acetate and denatured alcohol and plasticized with camphor. The carbon coated metal to which this second coat has been applied is fired to a temperature of about 200° C. in air. The finished carbon coating adheres well, is dense and uniform and has a surface which is fine grained and velvety black in appearance. The finished carbon coating is so adherent that metal coated according to my invention may be cut, rolled and pressed without dislodging the coating, and such operations are facilitated by the lubricating effect of the graphite. Radio tube parts made of my improved coated metal are good heat radiators and are not subject to uneven distribution of carbon common to the carbonized metal parts of the prior art.

My invention is defined with particularity in the appended claims and apparatus for carrying out one embodiment of my invention is described in the following specification and shown in the accompanying drawing in which Figure 1 diagrammatically represents one way of practicing my novel process and Figure 2 is a cross section of the coated metal after treatment according to my invention.

In Figure 1 of the drawing supply roll 1 furnishes a strip of uncoated metal 2, preferably with roughened surfaces provided either by sandblasting, steelblasting or by etching. The strip of uncoated metal is unwound and drawn in the direction of the arrow over rolls 3 running in a paste-like carbonaceous mixture 4 of fine carbon and graphite particles in an oleaginous binder preferably palmitic acid and lard oil. The mixture sticking to one or both sides of the metal is spread evenly over the strip by rotating brushes 5. The coated metal strip 8 with its thin coating, preferably only a fraction of a mil in thickness, of the paste passes through a small gas flame 6 to remove the more volatile constituents of the paste and then through the furnace 7, which is preferably held at a temperature which heats the metal strip to a temperature slightly below visible red heat and at a temperature between 300° C. and 650° C. An indifferent atmosphere of hydrogen or some inert gas, such as nitrogen or an incombustible mixture of nitrogen and hydrogen, is maintained in the furnace. The coated metal strip 8 is fed through the furnace at a rate such that complete decomposition of the oleaginous binder occurs in the furnace, the speed of course depending upon the temperature and length of the furnace. The metal may be fed, for example, at the rate of 10 to 20 feet per minute through a furnace approximately 24" in length and heated to 600° C., which is below visible red heat and above the decomposition temperature of the binder. After leaving the hydrogen furnace 7 the strip passes between revolving steel brushes 9 to remove all loose particles, leaving only a thin layer of carbon and graphite in close adherence to the metal strip. From the brushes 9 the coated metal strip passes over idling rollers through a non-aqueous liquid bath 10 of a dilute suspension of graphite or graphitic carbon in nitrocellulose. Good results have been obtained with a mixture of high fluidity by preparing this bath with 20 grams of nitrocellulose, 80 cc. of butyl acetate, 420 cc. of ethyl or denatured alcohol, 5 grams of camphor and 50 grams of powdered graphite with a particle size of about ½ to 2 microns. These proportions correspond to about 4% nitrocellulose, 14.5% butyl acetate, 70% alcohol, 1% camphor and 10.5% graphite. It will be obvious to those skilled in the art that the specific proportions mentioned are representative only and may be varied within wide limits to obtain a liquid bath of high fluidity containing fine graphite particles. Further the butyl acetate may be replaced by mixed ketones or dimethyl ketone and the camphor plasticizer may be replaced with castor oil or dibutyl phthalate. From this bath the strip is then drawn through an air furnace 11 and held at a temperature of about 200° C. by high frequency induction heating. The strip may be brushed if desired and coiled on roll 12.

If natural graphite is used it is first preferably acid washed or heated to remove volatile and solid impurities such as oil, grease, magnesia, alumina, iron oxide and traces of sodium.

The velvet black carbon coating on the metal prepared according to my invention is thicker and more adherent than the carbon coating obtained by applying one or two coatings according to the prior art. For example, I have found that by the paste method about .0008 gram per square inch of adherent carbon can be applied during the first pass of the strip over the rolls 3, but that second, third and fourth passes over these rolls increase the weight of the coating respectively to only .0014, 0016 and .0018 gram per square inch. However, by my invention the weight of the coating of the first pass is increased to .0034 gram per square inch when the graphite in liquid suspension is applied directly to the first carbon graphite coating. The carbon-graphite layer 13 on the metal strip 2, Figure 2, is materially increased in weight by the second layer 14 of graphite.

While I am not certain why so much coating from the liquid bath is retained, it is my belief that the first coating prepares a bed or mat of carbon and graphite particles, strongly adherent to and partially imbedded in the roughened surface of the metal strip and that the particles on the surface of the first coating lie in orderly rows as distinguished from a criss-cross pattern. Then, when the graphite particles in the liquid bath are floated on to this surface the graphite particles are free to orient themselves on the underlying mat and to arrange themselves in uniform rows, each particle of graphite being locked or keyed along its edge into the underlying coating.

The finished metal is a good heat radiator, probably because of the uniformity and thickness of the black coating.

Since this coating can be applied in one pass of the metal strip through my improved apparatus, the speed of manufacture is materially increased and the cost reduced. Making radio tube parts from my improved carbonized metal by punch and die presses is easy and convenient as the graphite surface of the coated metal is self-lubricated and wear on the dies is slight.

I claim:

1. The process of applying a graphitic carbon coating to metal comprising applying to the surface of the metal a layer of fine particles of graphitic carbon mixed with an oleaginous binder, decomposing the binder above room temperature and below visible red heat of the metal, and heating said coated metal to decompose said binder and vaporize its volatile constituents, brushing the metal to remove loose particles, and then submerging the metal in a non-aqueous liquid suspension of graphitic carbon particles in a nitrocellulose bath and heating said metal in air at about 200° C. to remove the binder of said liquid.

2. The process of carbonizing metal of the iron class which comprises etching the surface of the metal, coating the etched metal surface with an adhesive carbonaceous compound consisting of a pasty mixture of finely divided amorphous carbon and crystalline graphite and a binder of palmitic acid and lard oil, and heating the coated metal to a temperature between 300° C. and 650° C. to completely decompose said binder and leave an adhering coating of graphitic carbon on said metal, then wetting the coated metal with a liquid mixture of finely divided graphite and plasticized nitrocellulose and alcohol, and heating the wetted metal to about 200° C. to remove the vaporizable constituents of the liquid.

CLIFFORD EDDISON.